United States Patent [19]

Worchesky et al.

[11] Patent Number: 5,488,504
[45] Date of Patent: Jan. 30, 1996

[54] HYBRIDIZED ASYMMETRIC FABRY-PEROT QUANTUM WELL LIGHT MODULATOR

[75] Inventors: Terrance L. Worchesky, Columbia; Kenneth J. Ritter, Sykesville, both of Md.

[73] Assignee: Martin Marietta Corp., Bethesda, Md.

[21] Appl. No.: 109,550

[22] Filed: Aug. 20, 1993

[51] Int. Cl.$^6$ .................................................. G02F 1/03
[52] U.S. Cl. ............................................................ 359/248
[58] Field of Search ............................................... 359/248

[56] References Cited

U.S. PATENT DOCUMENTS

| | | |
|---|---|---|
| 4,053,763 | 10/1977 | Harney . |
| 4,059,759 | 11/1977 | Harney et al. . |
| 4,199,226 | 4/1980 | Weber et al. . |
| 4,525,687 | 6/1985 | Chemla et al. ............... 359/248 |
| 4,546,244 | 10/1985 | Miller ............................ 359/248 |
| 4,727,341 | 2/1988 | Nishi et al. . |
| 4,790,634 | 12/1988 | Miller et al. . |
| 5,036,371 | 7/1991 | Schwartz . |
| 5,047,822 | 9/1991 | Little, Jr. et al. . |
| 5,107,307 | 4/1992 | Onose et al. . |
| 5,115,335 | 5/1992 | Soref ............................. 359/248 |
| 5,144,397 | 9/1992 | Tokuda et al. . |
| 5,160,993 | 11/1992 | Ishikawa et al. ............. 359/248 |
| 5,315,430 | 5/1994 | Brennan et al. .............. 359/248 |

OTHER PUBLICATIONS

Electronics Letters, vol. 28, No. 17, Aug. 13, 1992, Enage GB, pp. 1658–1660, A. J. Moseley et al., "8 Channel, InGaAs/Inp Quantum Well Asymmetric Fabry–Periot Modulator Hybridised With Foundry VLSI Silicon CMOS Drive Circuits".

Applied Physics Letters, vol. 59, No. 14, Sep. 30, 1991, New York US, pp. 1664–1666, K. Hu et al., "Inverter Cavity GaAs/InGaAs Asymmetric Fabry–Perot Reflection Modulator".

Electronics Letters, vol. 28, No. 1, Jan. 2, 1992, Enage GB, pp. 12–14, A. J. Moseley et al., "Uniform 8×8 Array InGaAs/InP Multiquantum Well Asymmetric Fabry–Perot Modulators for Flipchip Solder Bond Hybrid Optical Interconnect".

I. Bar–Joseph et al., "Room–Temperature Electroabsorption and Switching in a GaAs/AlGaAs Superlattice," *Appl. Phys. Lett.* vol. 55, No. 4, pp. 340–342 (Jul. 24, 1989).

C. C. Barron et al., "K–Band Operation of Asymmetric Fabry–Perot Modulators," *IEEE Photonics Technology Letters* vol. 4, No. 5, pp. 459–461 (May 1992).

L. Buydens et al., "High–Contrast/Low–Voltage Normally On InGaAs/AlGaAs Asymmetric Fabry–Perot Modulator," *IEEE Trans. Photonics Technology Letters* vol. 3, No. 12, pp. 1104, 1106 (Dec. 1991).

L. Buydens et al., "Asymmetric Fabry–Perot Modulators With an InGaAs/AlGaAs Active Region," *Optical and Quantum Electronics* vol. 24, pp. S167–S175 (1992).

G. H. Döhler, "Solid–State Superlatices," *Scientific American* vol. 249, pp. 144–151 (Nov. 1983).

M. J. Goodwin et al., "Optoelectronic Arrays for Optical Interconnection of Circuits," *Digital Optical Computing II* vol. 1215, pp. 55–62 (1990).

(List continued on next page.)

Primary Examiner—Georgia Y. Epps
Assistant Examiner—Thomas Robbias
Attorney, Agent, or Firm—W. H. Meise; S. A. Young; G. Chin

[57] ABSTRACT

A device for converting a set of electronic signals that represent an image into a coherent image includes a two-dimensional array of asymmetric Fabry-Perot (ASFP), quantum-well-based optical modulators connected on a pixel-by-pixel basis to a two-dimensional array of drive circuits located on an integrated circuit. Electronic signals received by the integrated circuit cause the pixel drive circuits to change a bias voltage applied across the optical modulator section and, thereby, change the optical properties of the optical modulator section of the device. The two-dimensional array can be used to impart intensity-only, phase-only, or phase-and-intensity variations onto a beam of coherent laser light incident on the array. This coherent image can be used with other optical elements to form optical processing machines and optical storage devices.

10 Claims, 10 Drawing Sheets

OTHER PUBLICATIONS

K. W. Goossen et al., "Monolithic Integration of Normally–On and Normally–Off Asymmetric Fabry–Perot Modulators by Selective Antireflection Coating," *Appl. Phys. Lett.* vol. 60 (1992).

V. B. Gorfinkel, "Rapid Modulation of Interband Optical Properties of Quantum Wells by Intersubbband Absorption," *Appl. Phys. Lett.* vol. 60, pp. 3141–3143 (Jun. 22, 1992).

K. Hu et al., "Inverted CAvity GaAs/InGaAs Asymmetric Fabry–Perot Reflection Modulator," *Appl. Phys. Lett.* vol. 59, pp. 1664–1666 (Sep. 30, 1991).

K. Hu et al., "All–Optical Photonic Switches Using Integrated Inverted Asymmetric Fabry–Perot Modulators and Heterojunction Phototransistors," *IEEE Photonics Technology Letters* vol. 4, No. 3, pp. 263–266 (Mar. 1992).

M. Konagai et al., "High Efficiency GaAs Thin Film Solar Cells by Peeled Film Technology," *Journal of Crystal Growth* vol. 45, pp. 277–280 (1978).

U. Koren et al., "InGaAs/InP Multiple Quantum Well Waveguide Phase Modulator," *Appl. Phys. Lett.* vol. 50, pp. 368–370 (Feb. 16, 1987).

A. Larsson et al., "Optically Addressed Asymmetric Fabry–Perot Modulator," *Appl. Phys. Lett.* vol. 59, pp. 3099–3101 (Dec. 9, 1991).

K–K. Law et al., "Normally–Off High–Contrast Asymmetric Fabry–Perot Reflection Modulator Using Wannier–Stark Localization in a Superlattice," *Appl. Phys. Lett.* vol. 56, pp. 1886–1888 (May 7, 1990).

K–K. Law et al., "Self–Electro–Optic Device Based on a Superlattice Asymmetric Fabry–Perot Modulator with an On/Off Ratio<100:1," *Appl. Phys. Lett.* vol. 57, pp. 1345–1347 (Sep. 24, 1990).

K–K. Law et al., "Effect of Layer Thickness Variations on the Performance of Asymmetric Fabry–Perot Reflection Modulators," *J. Appl. Phys.* vol. 72, pp. 855–861 (Aug. 1, 1992).

K–K. Law et al., "Superlattice Surface–Normal Asymmetric Fabry–Perot Reflection Modulators: Optical Modulation and Switching," *IEEE Journal of Quantum Electronics* vol. 29, No. 2, pp. 727–740 (Feb. 1993).

J. Maserjian et al., "Optically Adressed Spatial Light Modulators by MBE–Grown nipi MQW Structures," *Applied Optics* vol. 28, No. 22, pp. 4801–4807 (Nov. 15, 1989).

A. J. Moseley et al., "Low Voltage InGaAs/InP Multiple Quantum Well Reflective Fabry–Perot Modulator," *Electronics Letters* vol. 26, No. 13, pp. 913–915 (Jun. 21, 1990).

A. J. Moseley et al., "Uniform 8×8 Array InGaAs/InP Multiquantum Well Asymmetric Fabry–Perot Modulators for Flipchip Solder Bond Hybrid Optical Interconnect," *Electronics letters* vol. 28, No. 1, pp. 12–14 (Jan. 2, 1992).

B. Pezeshki et al., "Optimization of Modulation Ratio and Insertion Loss in Reflective Electroabsorption Modulators," *Appl. Phys. Lett.* vol.57, pp. 1491–1492 (Oct. 8, 1990).

B. Pezeshki et al., "Novel Cavity Design for High Reflectivity Changes in a Normally Off Electroabsorption Modulator," *Appl. Phys. Lett.* vol. 58, pp. 813–815 (Feb. 25, 1991).

B. Pezeshki et al., "Electroabsorptive Modulators in InGaAs/AlGaAs," *Appl. Phys. lett.* vol. 59, pp. 888–890 (Aug. 19, 1991).

F. Stern et al., "Photon Recycling in Semiconductor Lasers," *Journal of Applied Physics* vol. 45, No. 9, pp. 3904–3906 (Sep. 1974).

J. A. Switzer et al., "Electrodeposited Ceramic Superlattices," *Science* vol. 247, pp. 444–445 (Jan. 26, 1990).

M. Whitehead et al., "Low–Voltage Multiple Quantum Well Reflection Modulator with On:Off Ratio<100:1," *Electronics Letters* vol. 25, No. 15 (Jul. 20, 1989).

T. H. Wood et al., "High–Speed Optical Modulation with GaAs/GaAlAs Quantum Wells in a p–i–n Diode Structure," *Appl. Phys. Lett.* vol. 44, pp. 16–18 (Jan. 1, 1984).

T. H. Wood et al., "Wavelength–Selective Voltage–Tunable Photodetector Made From Multiple Quantum Wells," *Appl. Phys. Lett.* vol. 47, pp. 190–192 (Aug. 1, 1985).

T. H. Wood et al., "High–Speed 2×2 Electrically Driven Spatial Light Modulator Made with GaAs/AlGaAs Multiple Quantum Wells (MQWs)," *Electronics Letters* vol. 23, No. 17, pp. 916–917 (Aug. 13, 1987).

J. Woodhead et al., "Low Voltage Strained layer Asymmetric Fabry–Perot Reflection Modulator," *Electronics Letters* vol. 26, No. 25, pp. 2117–2118 (Dec. 6, 1990).

E. Yablonovitch et al., "Extreme Selectivity in the Lift–Off of Epitaxial GaAs Films," *Appl. Phys. Lett.* vol. 51, pp. 2222–2224 (Dec. 28, 1987).

P. Zouganeli et al., "High Tolerances for a Low–Voltage, High–Contrast, Low–Insertion–Loss Asymmetric Fabry–Perot Modulator," *IEEE Photonics Technology Letters* vol. 3, No. 8, pp. 733–735 (Aug. 1991).

| 135 | Au | | | |
|---|---|---|---|---|
| | GROWTH CAP | 100.0Å | $In_{.08}Ga_{.92}As$ | $p=1\times10^{18}$ |
| 137 | ETCH TUNING LAYER | | | |
| | 74x { 20.0Å | $In_{.08}Ga_{.6254}As$ | $p=1\times10^{18}$ | |
| | 20.0Å | $In_{.0746}Al_{0.30}Ga_{.6254}As$ | $p=1\times10^{18}$ | |
| | BUFFER | | | |
| | 10x { 20.0Å | $In_{.08}Ga_{.6254}As$ | INTRINSIC | |
| | 20.0Å | $In_{.0746}Al_{0.30}Ga_{.6254}As$ | INTRINSIC | |
| 120 { 122 | QUANTUM WELL MODULATOR | | | |
| | 80x { BARRIER 50.0Å | $In_{.0746}Al_{0.30}Ga_{.6254}As$ | INTRINSIC | |
| | WELL 20.0Å | $In_{.08}Ga_{.6254}As$ | INTRINSIC | |
| | BARRIER 50.0Å | $In_{.0746}Al_{0.30}Ga_{.6254}As$ | INTRINSIC | |
| 124 | STRAIN LAYER SUPERLATTICE | | | |
| | 10x { SLS BARRIER 19.0Å | $Al_{.563}Ga_{.437}As$ | INTRINSIC | |
| | SLS WELL 56.0Å | $In_{.122}Al_{.494}Ga_{.384}As$ | INTRINSIC | |
| | STRAIN LAYER SUPERLATTICE | | | |
| | 57x { SLS BARRIER 19.0Å | $Al_{.563}Ga_{.437}As$ | $n=1\times10^{18}$ | |
| | SLS WELL 56.0Å | $In_{.122}Al_{.494}Ga_{.384}As$ | $n=1\times10^{18}$ | |
| 145 { 130 | MULTI-LAYER MIRROR | | | |
| | n_low 793.7Å | AlAs | $n=1\times10^{18}$ | |
| | 3x { n_low 664.6Å | GaAs | $n=1\times10^{18}$ | |
| | n_low 793.7Å | AlAs | $n=1\times10^{18}$ | |
| 141 | BUFFER 5000Å | GaAs | $n=1\times10^{18}$ | |
| 140 | SUBSTRATE | GaAs | INTRINSIC | |

Fig. 3

Fig. 4
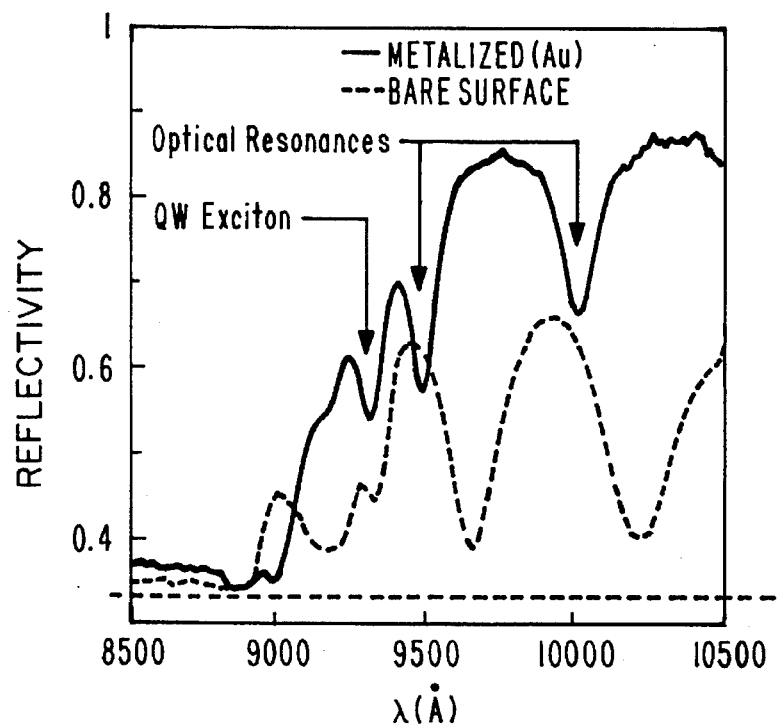
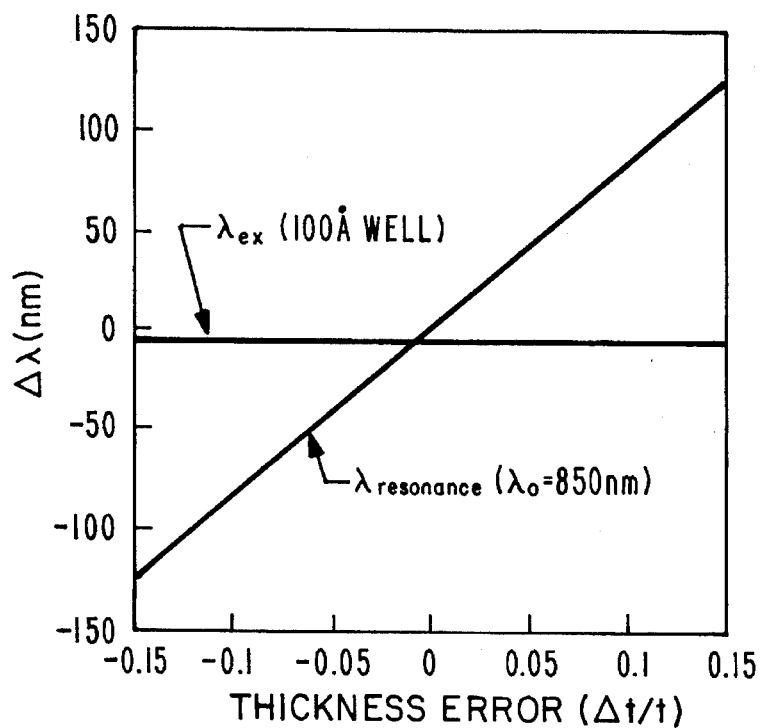
Fig. 5

| | | | | |
|---|---|---|---|---|
| | GROWTH CAP | 100.0Å | GaAs | n=1x10$^{18}$ |
| 130' { | MIRROR | | | |
| | HIGH INDEX | 534.3Å | Al$_{.3}$Ga$_{.7}$As | n=1x10$^{18}$ |
| | LOW INDEX | 748.3Å | AlAs | n=1x10$^{18}$ |
| | HIGH INDEX | 641.7Å | Al$_{.3}$Ga$_{.7}$As | n=1x10$^{18}$ |
| | LOW INDEX | 748.3Å | AlAs | n=1x10$^{18}$ |
| 180 { | n-CONTACT | | | |
| | 125x { WELL | 20.0Å | GaAs | n=1x10$^{18}$ |
| | BARRIER | 20.0Å | Al$_{.3}$Ga$_{.7}$As | n=1x10$^{18}$ |
| 182 | BUFFER | 200.0Å | Al$_{.3}$Ga$_{.7}$As | INTRINSIC |
| 122' { | QUANTUM WELL MODULATOR | | | |
| | 80x { WELL | 100.0Å | GaAs | INTRINSIC |
| | BARRIER | 50.0Å | Al$_{.3}$Ga$_{.7}$As | INTRINSIC |
| | BUFFER | | | |
| | 10x { WELL | 20.0Å | GaAs | INTRINSIC |
| | BARRIER | 20.0Å | Al$_{.3}$Ga$_{.7}$As | INTRINSIC |
| 137' { | ETCH TUNING LAYER | | | |
| | 80x { WELL | 20.0Å | GaAs | p=1x10$^{18}$ |
| | BARRIER | 20.0Å | Al$_{.3}$Ga$_{.7}$As | p=1x10$^{18}$ |
| 150 | ETCH STOP | 500.0Å | GaAs | |
| 145 | SEPARATION LAYER | 5000Å | AlAs | p=1x10$^{18}$ |
| | BUFFER | 5000Å | GaAs | INTRINSIC |
| 140' | GROWTH SUBSTRATE | | GaAs | |

*Fig. 9C*

HYBRIDIZED ASYMMETRIC FABRY-PEROT QUANTUM WELL LIGHT MODULATOR

BACKGROUND

This application relates to semiconductor quantum well devices for modulating the intensity and/or phase of incident light by variation of applied voltages.

Much work has been done recently on a wide range of electro-optic devices based on the electric-field dependence of strong absorption resonances in semiconductor quantum wells (Qws). These devices typically manipulate light having photon energies near the bandgaps of the quantum wells, corresponding to wavelengths around 1000 nanometers (nm) for gallium arsenide (GaAs) and low-indium-concentration InGaAs.

In a QW, a layer of one semiconductor material is sandwiched between cladding layers of a different material, with the electronic properties of the materials being such that an electric potential well (in the central layer) is formed between two electric potential barriers (in the cladding layers). The QW's small thickness, on the order of 100 Å, results in quantization of charge-carrier motion in the thickness direction that leads to formation of electron and hole sub-bands in the conduction and valence bands, respectively.

In addition, in QWs pairs of electrons and holes form bound states, called excitons, that are stable at room temperature because their binding energies are larger in a QW than in a bulk semiconductor. The excitons give the QW an optical absorption spectrum that has two peak wavelengths, a longer-wavelength peak due to heavy-hole excitons that is generally narrower and more optically useful than a shorter-wavelength peak due to light-hole excitons.

The stability of excitons in a QW leads to the quantum-confined Stark effect, in which the wavelengths of the QW's peak optical absorptions associated with the creation of light- and heavy-hole excitons shift to longer wavelengths in response to an applied electric field. Since these peak excitonic absorptions have finite spectral widths due to electron/hole interactions with material impurities and phonons, the transmissivity of a QW at a wavelength near a peak varies as the applied field varies. Typical electric fields range from 10,000 to 100,000 volts per centimeter. The wavelength shifts in the peak excitonic absorptions also lead to a variation in the refractive index of the QW layer at wavelengths slightly longer than the peak wavelengths, making it possible to obtain sizable shifts in optical phase. These and other aspects of QW devices are described in commonly assigned U.S. Pat. No. 5,047,822 to Little, Jr., et al., which is expressly incorporated here by reference.

Because a single QW is so thin, devices are typically made by stacking a number, e.g., fifty, of QWs in order to obtain significant optical effects. Many aspects of multiple quantum well (MQW) devices are described in the literature, including C. Weisbuch et al., *Quantum Semiconductor Structures*, Academic Press, Inc., San Diego, Calif. (1991).

A simple MQW device is the absorption modulator, in which the excitonic absorption edge of the quantum wells is moved into and out of coincidence with the wavelength of a spectrally narrow light source, such as a laser, by varying an applied electric field. Thus, the intensity of the light transmitted or reflected by the modulator varies according to the applied electric field, or bias voltage, as noted above.

One such absorption modulator, although based on Wannier-Stark localization rather than the quantum-confined Stark effect, is described in K.-K. Law et al., "Normally-Off High-Contrast Asymmetric Fabry-Perot Reflection Modulator Using Wannier-Stark Localization in a Superlattice" *Applied Physics Letters* vol. 56, pp. 1886–1888 (May 7, 1990); and K.-K. Law et al., "Self-Electro-Optic Device Based on a Superlattice Asymmetric Fabry-Perot Modulator with an On/Off Ratio>100:1", *Applied Physics Letters* vol. 57, pp. 1345–1347 (Sept. 24, 1990). In contrast to the QW's shift of the excitonic absorption peaks to longer wavelengths due to the quantum-confined Stark effect, Wannier-Stark localization leads to a shift to shorter wavelengths for increased electric field in superlattice structures.

Aspects of superlattices, which are also structures of thin alternating layers of two materials having different electronic properties, are described in G. Dohler, "Solid-State Superlattices" *Sci. Am.* vol 249, pp. 144–151 (Nov. 1983). In general, a superlattice is a stack of interleaved thin barrier layers and QWs in which the Qws are resonantly coupled, causing the QWs' discrete charge-carrier energy levels to broaden into minibands. Applying an electric field destroys the resonance, misaligning the energy levels in neighboring QWs and localizing them over a few Qws. This changes the optical absorption spectrum from a smooth, miniband profile to a peaked, Qw-excitonic profile and blueshifts the absorption edge.

As described in more detail below, Applicants' invention can be embodied using either MQW or superlattice structures. Also, it will be understood that such structures described in this application can be fabricated by a wide variety of semiconductor processing methods, e.g., metal-organic chemical vapor deposition, molecular beam epitaxy, and electrochemical deposition methods. See, e.g., J. Switzer et al., "Electrodeposited Ceramic Superlattices" *Sci.* vol 247, pp. 444–445 (Jan. 26, 1990); and the above-cited Weisbuch et al. book.

Other MQW modulators capable of varying the intensity and phase of optical signals are described in U.S. Pat. No. 4,727,341 to Nishi et al and T. Wood et al., "High-Speed Optical Modulation with GaAs/GaAlAs Quantum Wells in a P-I-N Diode Structure", *Applied Physics Letters* vol. 44, pp. 16–18 (Jan. 1, 1984).

Another type of MQW absorption modulator is described in U. Koren et al., "InGaAs/InP Multiple Quantum Well Waveguide Phase Modulator", *Applied Physics Letters* vol. 50, pp. 368–370 (Feb. 16, 1987). The device consists of sixty InGaAs well layers and indium phosphide (InP) barrier layers disposed in the undoped core of an optical waveguide doped as a P-I-N structure. A phase shift of 180° for light having a wavelength near 1500 nm is reported for a bias of 15–20 volts.

The recent publication, V. Gorfinkle et al., "Rapid Modulation of Interband Optical Properties of Quantum Wells by Intersubband Absorption" *Applied Physics Letters* vol. 60, pp. 3141–3143 (Jun. 22, 1992), describes the theory of a doped MQW absorption modulator in which the band-to-band absorption strength for near-infrared (NIR) photons, i.e., wavelengths from about 800 nm to 2000 nm, would be modulated by intersubband absorption of long-infrared (LIR) photons, i.e., wavelengths from about 8000 nm to 12000 nm. The LIR absorption would partially deplete the population of carriers in the ground state, thereby changing the density of final states for NIR absorption. A significant drawback of such a device for a purpose such as converting LIR information into NIR information would be the interdependence of the operating LIR and NIR wavelengths due to the absorptions occurring in the same MQW structure. Moreover, a very large LIR flux and fabrication in a waveguide geometry are needed for significant NIR absorption modulation.

Simple MQW absorption modulators operating at room temperature can exhibit modulation depths, i.e., ratios of minimal to maximal absorptions, of about 10:1 to 30:1. These low modulation depths can be improved by combining an MQW structure with a suitable resonant optical cavity, such as an asymmetric Fabry-Perot etalon (ASFPE). An ASFPE is a resonant optical cavity formed by two planar mirrors that have different reflectivities. Like a symmetric FPE, the wavelengths at which the ASFPE resonates are periodically distributed and are determined by the distance between the mirrors. Design aspects of ASFPE-MQW modulators are described in K. -K. Law et al ,. "Superlattice Surface-Normal Asymmetric Fabry-Perot Reflection Modulators: Optical Modulation and Switching" *IEEE J. Quantum Electronics* vol. 29, pp. 727–740 (Feb. 1993).

For a normally-on ASFPE-MQW modulator, i.e., a modulator having high transmission (or reflection) when no electric field is applied to the MQW structure, one of the Fabry-Perot resonance wavelengths is set to a wavelength slightly longer than the peak wavelength of the quantum wells' heavy-hole exciton absorption under zero voltage bias. Applying the proper bias voltage causes the absorption peak wavelength to shift toward the FPE-resonance wavelength, thereby balancing the effective reflectivities of the mirrors and modulating the light transmitted or reflected from the device.

An array of such ASFPE-MQW modulators can be disposed on a substrate, by epitaxial growth, for example, to form a spatial light modulator (SLM). A two-dimensional array of absorption modulators is described in T. Wood et al., "High-Speed 2×2 Electrically Driven Spatial Light Modulator Made with GaAs/AlGaAs Multiple Quantum Wells (MQWs)", *Electronics Letters* vol. 23, pp. 916–917 (Aug. 13, 1987). The modulators are planar devices formed on a GaAs substrate, consisting of fifty AlGaAs/GaAs quantum wells disposed in an undoped region of a reverse-biassed P-I-N diode and surrounded by thin undoped superlattice regions. Incident light propagates through the modulators and perpendicular to the substrate, yielding a reported on/off intensity ratio of about 1.5:1 for wavelengths near 850 nm.

U.S. Pat. No. 5,115,335 to Soref describes an array of MQW devices and ASFPEs for binary or ternary modulation of the phase of an input light beam. The simultaneous variation of amplitude and phase is also discussed, and an electrical bias on the MQW devices is varied to obtain the phase modulation. On the other hand, the bias on each MQW device of the array must be selectively adjusted to compensate for device thickness variations. Also, the Soref patent does not describe continuous modulation of either phase or amplitude.

U.S. Pat. No. 5,107,307 to Onose et al. describes an intensity modulator comprising an MQW device disposed in an FPE and a spatial modulator comprising an array of such MQW-FPE combinations. The transmissivity of the intensity modulator can be continuously selected by varying a bias voltage applied to the MQW device. Onose is silent on phase modulation and on any technique for compensating for the inevitable variations in the modulator characteristics.

U.S. Pat. No. 4,790,634 to Miller et al. describes an optically bistable FPE in which the mirrors may have differing reflectivities, i.e., the FPE may be asymmetric. Miller illustrates PIN-diode-type MQWs disposed within FPEs, and describes varying a bias voltage on the MQWs to tune the bistable structure. On the other hand, Miller is silent on any technique for compensating for the inevitable variations in the modulator characteristics.

U.S. Pat. No. 4,525,687 to Chemla et al. describes a light modulator that includes MQWs. The shift of the peak wavelength of heavy-hole exciton absorption is described, as are PIN diode structures. The MQWs may be disposed in FPEs, with the resulting structures being electrically tunable.

Many current ASFPE-MQW SLMs have the incident light strike the top of the ASFPE-MQW structures because the substrates are usually opaque to the incident light. Thus, the electronic circuits used to bias the quantum wells are connected via electrically conductive lines that must be located on the surfaces of the ASFPE-MQW structures. Connecting the optical sections (the ASFPE-MQW structures) to the electronic sections (the voltage bias circuits) of the SLM in this way limits the practical array size and speed. As an array grows larger, the multiple conductive lines occupy larger and larger portions of the optical sections' surfaces, reducing the optically useful portion of the substrate area. The length of the conductive lines and their proximity to one another also limit the speed of the device due to the impedance of and cross-talk between long lines.

Another drawback of previous ASFPE-MQW spatial light modulators is they cannot be easily modified after the optical sections have been deposited on the substrate. If the thickness of an FPE cavity does not produce a resonance wavelength that is correctly placed relative to the corresponding quantum wells' absorption peak wavelength, the thickness cannot be altered via standard semiconductor processing techniques. Moreover, variations in the layer thicknesses, inherent in standard deposition processes, cause variations in the FPE resonance wavelength across an array that cannot be easily corrected. Prior devices have attempted to compensate for these variations by applying individual correction voltages to each array element. This approach, however, affects the operating wavelength, greatly increases the complexity of the bias and control electronic circuits, and due to the increased size of the circuitry, limits the fill factors of the arrays to about 70% and drastically reduces their speed as a result of the increased capacitance.

Some prior modulators have attempted to overcome these problems by first epitaxially growing the ASFPE and MQW structures on a substrate like GaAs and then bonding a silicon substrate having desired electrical connections on top that fan out from the SLM array to electrical contact pads outside the area covered by the SLM array. Such a device is described in A. Moseley et al., "Uniform 8×8 Array InGaAs/InP Multiquantum Well Asymmetric Fabry-Perot Modulators for Flipchip Solder Bond Hybrid Optical Interconnect", *Electronics Letters* vol. 28, pp. 12–14 (Jan. 2, 1992). For large two-dimensional arrays, this type of electrical addressing is impractical.

Another such device is described in K. Hu et al., "Inverted Cavity GaAs/InGaAs Asymmetric Fabry-Perot Reflection Modulator" *Applied Physics Letters* vol. 59, pp. 1664–1666 (Sep. 30, 1991). The Hu paper also mentions that the as-grown MQW cavity can be characterized and its thickness adjusted prior to deposition of the second mirror of the ASFPE in order to tune the cavity's resonance wavelengths.

Other devices have had MQW structures grown on a GaAs substrate without ASFPE structures, then had another substrate like sapphire bonded on top, and then had at least part of the GaAs substrate etched away to allow optical access to a single pixel See I Bar-Joseph et al., "Room-Temperature Electroabsorption and Switching in a GaAs/AlGaAs Superlattice", *Applied Physics Letters* vol. 55, pp. 340–342 (Jul. 24, 1989).

SUMMARY

In contrast to previous devices, a high-fill-factor modulator array in accordance with Applicants' invention employs a low-finesse asymmetric Fabry-Perot etalon and a multiple-quantum-well structure to produce one of a change in the intensity of a light beam reflected from the device with no change in the phase of the reflected light, a $\pi$-radian change in the phase of the reflected light with no change in its intensity, or a selectable combination of changes in the intensity and the phase of the reflected light.

In one aspect of Applicants' invention, a hybridized modulator comprises an optical section disposed on a substrate that is transparent at the Fabry-Perot cavity's operating wavelength and a multiplexed electronics driver disposed on a second substrate that supplies a bias voltage to each pixel of the optical section. This allows optical radiation to enter from the substrate side of the device, and thus the upper surface of the optical section can be directly connected to the electronics section on a pixel-by-pixel basis, by indium-bump bonds, for example. Such a hybridized optical-electronic modulator has significantly reduced fabrication costs and difficulties compared to previous devices.

In another aspect of their invention, two-dimensional arrays of Applicants' hybridized optical-electronic modulators can be made in almost any size and have greater than 95% fill-factors since electrical contacts to the electronic drive circuitry can be made on the back sides of the devices without interfering with the surfaces where light enters the optical sections. Applicants' use of metallic mirrors on the upper surfaces of the optical sections permits high fill-factors to be achieved because the metal mirrors can act as masks during the pixel delineation etch, permitting definition of small, e.g., 1-micrometer ($\mu$m), gaps between the pixels. Also, by including an etch tuning layer in the structure the arrays can be locally corrected for thickness variations that have occurred during material deposition. Using standard processing techniques (such as wet chemical etching or reactive ion etching) the tuning layer can be thinned causing the resonance wavelength of each ASFPE to be tuned to the correct position relative to the peak wavelength of the excitonic absorption of its included MQW structure. Thus, the tolerances on the optical characteristics across the array can be maintained at levels that make the arrays useful for optical processing machines, optical storage devices, and image display systems.

In yet another aspect of the invention, Applicants' modulator can be combined with a photodetector to obtain an optically addressed SLM.

BRIEF DESCRIPTION OF THE DRAWINGS

The features and advantages of Applicants' invention will be better understood by reading the following detailed description in conjunction with the drawings in which:

FIG. 3 is a schematic diagram representative of a multi-layer structure of an intensity modulator in accordance with one embodiment of Applicants' invention;

FIG. 4 shows reflection spectra of an ASFPE-SLM having zero bias voltage, demonstrating the resonance wavelength shift caused by application of the metal mirror $M_2$;

FIG. 5 shows a comparison of the wavelength shifts of the quantum well excitons and optical resonances resulting from layer thickness errors;

FIGS. 9A, 9B, and 9C are schematic diagrams representative of a multi-layer structure of an intensity modulator in accordance with another embodiment of Applicants' invention;

DETAILED DESCRIPTION

Figure 1A:
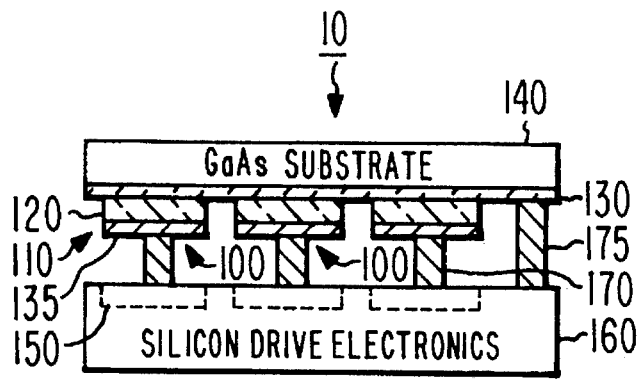
FIGS. 1A, 1B illustrate a hybridized asymmetric Fabry-Perot quantum-well spatial light modulator in accordance with Applicants' invention.

FIG. 1A is a schematic diagram of a partial cross-section of a hybridized asymmetric Fabry-Perot etalon multiple quantum well spatial light modulator (ASFPE-MQW SLM) 10. The figure shows cross-sections of only three ASFPE-MQW modulators 100, i.e., three pixels of the SLM 10, but it will be appreciated that the SLM 10 would typically include many more than three pixels arranged in a square, rectangular, or other configuration as desired. An SLM comprising a 5×5 array of pixels is illustrated in FIG. 1B that is described further below.

Figure 1B:
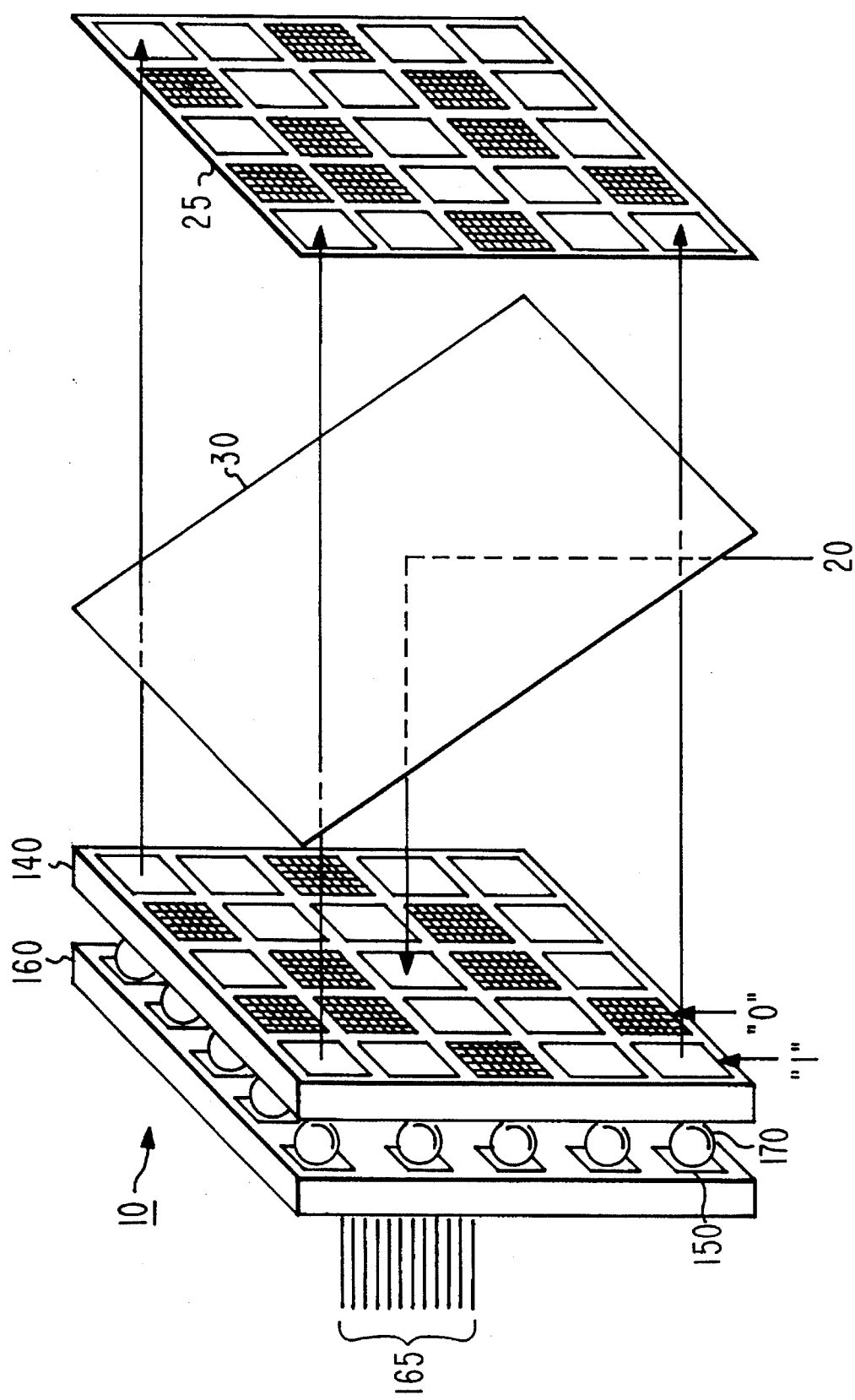

As seen in FIGS. 1A, 1B, each ASFPE-MQW modulator 100 comprises an optical section 110 including an active optical layer 120 disposed between first and second mirrors 130, 135, which form an asymmetric Fabry-Perot etalon. Each active optical layer 120 includes a series of quantum wells that form the intrinsic (I) section of a P-I-N diode arrangement such that the peak of the QWs' photon absorption due to heavy-hole excitons is voltage-tunable. Each mirror 130 is advantageously a partially reflective dielectric mirror that is a portion of a layer deposited on a substrate 140, and the mirror 135 is preferably a highly reflective metal layer.

The dielectric mirror 130 is a series of dielectric layers having optical properties such that, when taken together, the series has a predetermined reflectivity at a predetermined wavelength slightly longer than the peak of the MQW structure's photon absorption when no voltage bias is applied. As described in more detail below, the layers 120 and dielectric mirror 130 may be formed by a process such as epitaxial growth on the substrate 140. The array of optical sections 110 on the substrate 140 comprise the optical array of the ASFPE-MQW SLM 10.

Each ASFPE-MQW modulator 100 further comprises an electronics section 150 including circuitry for applying a controllable bias voltage to its respective active optical layer 120. An ASFPE-MQW SLM having N×M pixels would include N×M optical sections and N×M electronics sections. These N×M electronics sections comprise the drive electronics of the ASFPE-MQW SLM. According to one aspect of Applicants' invention, the SLM is sufficiently uniform so that all of the electronics sections apply the same bias voltage. This uniformity avoids the enormous complexity needed for imposing different voltages on different array elements in order to normalize the responses of the array elements.

The electronics sections 150 are conveniently fabricated as parts of an integrated circuit 160 that also includes suitable control and timing circuits for interfacing the SLM 10 with electrical or optical signals from other devices, such as a computer or process controller. The circuit 160 may advantageously include memory or means for implementing simple computational functions, as well as means for combining the signals of selected optical pixels.

The drive electronics may be designed to provide bias voltages to the optical array in several display formats. One specific display format is for the drive circuit to receive the input data signals and store a new data value for each pixel without changing the bias to each pixel. Once all pixels have been assigned a new data value, the drive circuit changes the bias values for all pixels in accordance with the new data values. In this way, the N×M array of optical sections would change reflectivity values simultaneously on a frame-by-frame basis.

A second display format is for the drive circuit to receive input data signals and store a new data value for each pixel in the first row of the N×M array. Once this row has been assigned a new set of data values, the drive circuit changes the bias values for all pixels such that the m-th pixel in row j changes bias value to that of the m-th pixel in row j-1 (where m is an index that runs from 1 to M and j is an index that runs from 1 to N) and the pixels in row 1 are assigned the biases determined by the new data values. In this way, the reflected image produced by the SLM scrolls across the SLM producing a systolic display.

An additional display format is to supply signals to the drive electronics such that only the bias values to a subset of selected pixels are changed. This will be recognized as a random-access addressing format. It will be appreciated that the addressing formats described here are but a few of many possible formats that could be used.

The input signals to the drive electronics can also be supplied via optical signals with an individual optical signal for each addressed electronics section. The optical input signals enter from the bottom of the structure as shown in FIG. 1A, passing through the drive electronics substrate 160 to the electronics section 150. In this case, the electronics section contains an optically sensitive element that is included in the circuit such that the incident optical input signal causes a change in the bias voltage produced by the electronics section. Additional electrical inputs to the drive circuit may be used in conjunction with these optical signals to provide power and timing. Optical addressing of the SLM can be used to convert incoherent images to coherent images or as an alternative to electrical addressing, providing for higher data rates and lower cross-talk between pixels.

As described above, optical addressing can be accomplished by illuminating a photo-sensitive device in each electronics section 150 through the drive electronics substrate 160. Because the substrate 160 is normally opaque to optical radiation, provision must be made to transmit the optical signal through the substrate. In one embodiment, the drive circuit can be fabricated on a silicon-on-sapphire substrate. In this structure, the substrate 160 is sapphire, which is transparent to optical radiation. This allows transmission of the optical signals to the photo-sensitive element in each electronics section. In a second embodiment, an optical via hole can be formed through the drive electronics substrate using a standard technique such as laser drilling. Light entering the optical via hole is then transmitted through the substrate 160 to the photo-sensitive element.

Each optical section 110 is electrically connected to its respective electronics section 150 by an indium-bump or solder bond 170. The other electrical connection to each optical section is made to a ground plane formed by the layers forming the dielectric mirror 130 and the doped buffer layer 141 (seen in FIG. 3). The ground plane is distributed throughout the array by the n-doped layers of each optical pixel and the underlying material. Spaced regularly around the array are other indium-bump or solder bonds 175 that electrically connect the ground plane to the integrated circuit 160.

Referring in particular to FIG. 1B, the SLM 10 can be used by illuminating it with light 20 having a wavelength (the "operating wavelength") determined by the resonance wavelengths of the ASFPEs and the peak excitonic absorptions of the MQWs. The light 20 may conveniently be generated by a laser or an equivalent narrowband source such as a combination of a monochromator and a high-intensity broad band source. A beamsplitter 30 directs the light 20 on to the SLM 10, each pixel of which selectively reflects the incident light back to the beamsplitter 30. As shown in FIG. 1B, each pixel, which is typically about 25 μm to 50 μm on a side, can be set either to a highly reflecting state (indicated by the white squares or the "1") or to a low reflecting state (indicated by the dark squares or the "0") in response to a plurality of electrical input signals 165 provided to the integrated circuit 160. Thus, an image 25 of the SLM 10 is transmitted by the beamsplitter 30 that is, in effect, a transformation of the electrical or optical input signals 165 into variations in the intensity or phase of light at the operating wavelength.

Figure 2:
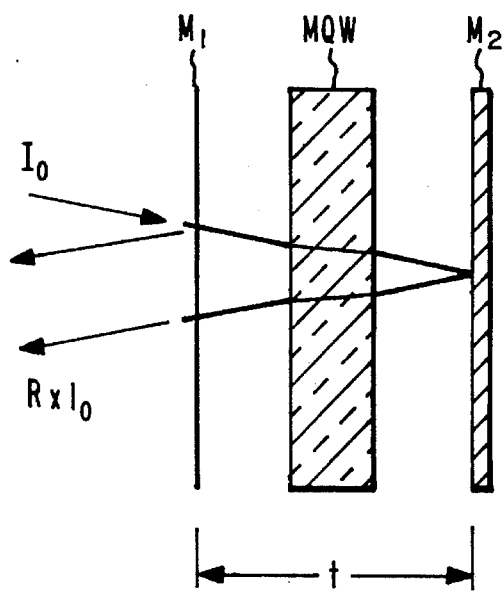
FIG. 2 is a schematic diagram of a generalized ASFPE modulator.

An ASFPE-MQW modulator is schematically illustrated in FIG. 2. It includes two parallel mirrors $M_1$, $M_2$ having intensity reflectivities $R_1$, $R_2$, respectively. Mirror $M_1$ is partially reflecting such that its transmissivity is $T_1 = 1 - R_1$. Mirror $M_2$ may be completely reflecting such that its transmissivity is $T_2 = 0$ ($R_2 = 1$). To form an optical modulator, an MQW structure having an externally controllable absorptivity is disposed between the two mirrors. Additional spacer layers or other means for separating the mirrors (not shown) may be included between the two mirrors to achieve a predetermined thickness t.

A convenient parameter for quantifying the optical properties of the ASFPE is provided by the finesse (F) of the cavity given by the following relation:

$$F = \frac{\pi}{\arccos\left[\dfrac{2 \cdot T_{MQW} \cdot \sqrt{R_1 \cdot R_2}}{1 + T_{MQW}^2 \cdot R_1 \cdot R_2}\right]}$$

In accordance with an aspect of Applicants' invention, the ASFPEs advantageously have low finesse in order to facilitate matching the optical responses of the elements of an SLM.

The finesse is related to the full width at half maximum (FWHM) of the cavity resonance ($\gamma$) by the relation:

$$F = \frac{2 \cdot \pi}{\gamma}$$

where $\gamma$ is in radians.

The finesse at zero bias (where $T_{MQW}$ is approximately 1) can be used to estimate the uniformity and accuracy required in the thickness of the cavity. A single pixel of an SLM must be operated within a narrow wavelength range around the resonance peak. The width of this range proportional to the resonance width is described in the equation below:

$$\lambda_{resonance} - \epsilon \cdot W_{FWHM} < \lambda_{operate} < \lambda_{resonance} + \epsilon \cdot W_{FWHM}$$

Where $W_{FWHM}$ is the width of the resonance line and $\epsilon$ is a unitless parameter that depends on the precision required for a given application (a value of 0.1 is typical). When operating as an array of pixels, the operating wavelength is a constant for all pixels in the array since they are all illuminated by the same source; the resonance wavelength, however, may vary from pixel to pixel due to variations in the layer thickness across the array. In this case the condition on the wavelength becomes:

$$\lambda_{operate} - \epsilon \cdot W_{FWHM} < \lambda_{resonance} < \lambda_{operate} + \epsilon \cdot W_{FWHM}$$

Using the above equations and the relation between phase ($\phi$) and cavity thickness (d), $\phi = 4 \cdot \pi \cdot n_{<>} \cdot d / \lambda$, where $n_{<>}$ is an average refractive index in the cavity, the allowed thickness variation ($\tau$, such that $d = d_0 \pm \tau$) in the cavity can be written as:

$$\tau = \frac{\lambda}{2 \cdot n_{<>} \cdot F} \cdot \epsilon$$

In accordance with this result, a low finesse is advantageous since it allows a larger thickness tolerance than a high finesse allows. For a high finesse (e.g., 74, that results from $R_1 = 0.93$ and $R_2 = 0.988$) and assuming $\lambda = 840$ nm, $n_{<>} = 3.4$, and $\epsilon = 0.1$, the thickness tolerance is 1.7 Å. In a low-finesse cavity used in the SLM described here ($R_1 = 0.40$, $R_2 = 0.94$ producing $F = 6.7$) the tolerance is 18.5 Å allowing more than ten times the thickness variation of the high finesse case.

When light of intensity $I_0$ strikes the modulator, it is reflected with intensity $I \cdot R_{SLM}$, where $R_{SLM}$ is the total effective reflectivity of the modulator, given by the following relation:

$$r_{ASFPE} = \frac{\sqrt{R_1} + T \cdot P \cdot \sqrt{R_2}}{1 + P \cdot T \cdot \sqrt{R_1 \cdot R_2}} \quad \text{Eqn. 1a}$$

$$P = \exp\left[ i \cdot \left( \frac{4 \cdot \pi}{\lambda} \right) \cdot \sum_k t_k \cdot n_k + i \cdot (\phi_1 - \phi_2) \right] \quad \text{Eqn. 1b}$$

$$r_{SLM} = \frac{\sqrt{R_1} - T_{MQW} \cdot \sqrt{R_2}}{1 - T_{MQW} \cdot \sqrt{R_1 \cdot R_2}} \quad \text{Eqn. 1c}$$

$$R_{SLM} = |r_{SLM}|^2 \quad \text{Eqn. 1d}$$

where:

$r_{ASFPE}$=general expression for the amplitude reflection coefficient of an ASFPE;

$r_{SLM}$=expression for the amplitude reflection coefficient of an ASFPE for the case of P=−1;

$R_{SLM}$=intensity reflectivity for the P=−1 SLM ASFPE;

$\lambda$=operating wavelength;

$t_k$=thickness of layer k;

$n_k$=refractive index of layer k;

k=index summed over all layers between the two mirrors;

$\phi_1$=phase shift caused by reflection from $M_1$ (for light incident from the left in FIG. 2);

$\phi_2$=phase shift caused by reflection from $M_2$ (for light incident from the left in FIG. 2); and where $T_{MQW}$ is the intensity transmissivity for one pass through the absorbing MQW structure and P is a phase term. Here, an upper-case R denotes intensity reflectivity, while a lower-case r denotes the reflection coefficient of the electric field amplitude, which contains phase information. For both intensity and phase modulators, the effective cavity thickness is chosen so that the phase term P is −1, i.e., the phase of light reflected from mirror $M_1$ differs by 180° from the phase of light reflected from mirror $M_2$. The reflectivity of the modulator ($r_{SLM}$) is then given by Eqn. 1c. This produces a narrow-band optical resonance where the reflectivity of the cavity is reduced due to destructive interference of the reflections from the two mirrors. It will be appreciated that the operating wavelength of the device must coincide with one of these optical resonances, which are fixed upon fabrication of the ASFPE.

In the initial state of zero applied electric field (where $T_{MQW} \approx 1$), the light intensity reflected from the modulator at the FPE resonance wavelength is due to the higher reflectivity of the mirror $M_2$, resulting in a non-zero numerator in Eqn. 1c.

For both the intensity and phase modulators, modulation is obtained by applying an external electric field to the MQW structure, which varies the transmissivity $T_{MQW}$. For a QW layer, the applied electric field shifts the peak excitonic absorption wavelength into coincidence with an FPE resonance wavelength, increasing the absorption of light in the FPE at the resonance wavelength. The off-state of the modulator, i.e., R=0, is obtained when the transmissivity $T_{MQW}$ decreases (or the mirror reflectivities are adjusted) to a value $T_{off}$ given by the following relation:

$$T_{off} = (R_1/R_2)^{1/2} \quad \text{Eqn. 1e}$$

where the reflectivities of the mirrors are effectively balanced in the initially asymmetric etalon causing the numerator in Eqn. 1c to go to zero. It will be appreciated that the decrease in reflected intensity is due to the previous selection of the phase term P as −1.

Further decreasing $T_{MQW}$ causes R to again become non-zero but the phase of the reflected light is shifted by 180° from the phase when $T_{MQW}$ is maximal. This can be understood from Eqn. 1c by recognizing that decreasing its effectively removes the reflection from mirror $M_2$ or decreases its reflectivity so that $r_{SLM}$ again becomes non-zero. The transition from $T_{MQW}=1$ to $T_{MQW}=0$ results in a change of sign in $r_{SLM}$ which corresponds to a phase shift of 180° in the reflected light. In general, the phase of the reflected light is given by the following relation:

$$\theta = arg\left[ \frac{\sqrt{R_1} - T\sqrt{R_2}}{1 - T\sqrt{R_1 R_2}} \right] \quad \text{Eqn. 1f}$$

Accordingly, the modulator has three states: high reflecting, zero reflecting, and high reflecting with 180° phase shift.

For an intensity modulator, the reflectivity $R_1$ of mirror $M_1$ is preferably selected such that the modulator's reflectivity R is zero when $T_{MQW}=T_{off}$, where, for both intensity and phase modulators, $T_{off}$ is the minimum transmission obtainable (at the operating wavelength) by applying a bias across the quantum well layers. This gives the modulator the highest possible reflectivity at the high-transmission state, i.e., when $T_{MQW}=T_{on}$. For eighty 100-Å quantum wells having their operating wavelength 10 nm longer than the zero-bias exciton wavelength, $T_{on} \approx 1$ and $T_{off} \approx 0.5$. This optimum value for the first mirror's reflectivity is given by the following relation:

$$R_1^{t-opt} = T_{off}^2 \cdot R_2 \quad \text{Eqn. 2a}$$

which is obtained from Eqn. 1c For a value of $R_1 = R_1^{I-opt}$ and when an external electric field is applied, the reflectivity of the modulator ranges between R=0 and R=$R_{on}$ according to the following relation:

$$R_{on} = R_2 \left( \frac{T_{off} - T_{on}}{1 - T_{on}\sqrt{R_1 \cdot R_2}} \right)^2 \quad \text{Eqn. 2b}$$

For both intensity and phase modulators, the reflectivity $R_2$ of mirror $M_2$ should be as high as possible to produce the greatest optical throughput when $T_{MQW}$ is maximal. As $M_1$ is a multilayer dielectric mirror, the reflectivity can be adjusted to the desired value by selecting the correct combination of the number of layers and the refractive index differences between the types of layers.

In practice, inaccuracies in thickness and composition of the layers of mirror $M_1$ will cause $R_1$ to differ from the optimum reflectivity $R_1^{I-opt}$. To ensure proper operation of the modulator (i.e., that it will reach the zero-reflectivity point when bias is applied), the less stringent condition $R_1 \geq R_1^{I-opt}$ must be met. Mirror $M_1$ can then be designed such that $R_1$ is several percent higher than $R_1^{I-opt}$, thus ensuring that $R_1 \geq R_1^{I-opt}$ so that the modulator will operate properly even with slight variation in the structure.

The arrangement illustrated in FIG. 2 can also be used as a binary phase modulator, in which the two phase states correspond to the maximum and minimum electro-optic layer transmissions $T_{on}$, $T_{off}$, respectively. For an optimal binary phase-only modulator, the device parameters are chosen to give the same reflected intensity ($R_{SLM}$ in Eqn. 1d) at the two phase states, and this reflected intensity should be as large as possible. The optimal value for the reflectivity $R_1$ that meets these requirements is given by the following relation:

$$R_1^{\phi-opt} = \frac{[1 + T_{on} \cdot T_{off} \cdot R_2 + (1 - T_{off}^2 \cdot R_2)^{1/2} \cdot (1 - T_{on}^2 \cdot R_2)^{1/2}]^2}{[R_2^{1/2} \cdot (T_{on} + T_{off})]^2} \quad \text{Eqn. 3a}$$

A modulator having the value of $R_1 = R_1^{\phi-opt}$ produces a phase shift of 180° between the low- and high-absorbing states of the MQW structure. The intensity reflectivity of such a binary modulator in these two states is given by the following relation:

$$R_{on} = R_{off} \left[ \frac{R_1^{1/2} - T_{off} \cdot R_2^{1/2}}{1 - T_{off}\sqrt{R_1 \cdot R_2}} \right]^2 \quad \text{Eqn. 3b}$$

where $R_{on}$, $R_{off}$ are the intensity reflectivities in the 0° and 180° phase states, respectively.

In practice, the condition $R_1 = R_1^{\phi-opt}$, which leads to the balancing of the phase modulator so that $R_{on} = R_{off}$, can never be exactly met due to imprecision in the thicknesses and compositions of the layers in mirror $M_1$. In this phase modulator, imbalance due to such an error can be compensated by adjusting the electrical biases in the two phase states.

For the case $R_1 < E_1^{\phi-opt}$, the resulting reflectivities will be unbalanced such that $R_{on} > R_{off}$. In this case the modulator can be balanced by increasing the absorption between the two mirrors in the on state. This increase in absorption can be achieved by applying a common bias to all the pixels in the device. As a small bias is applied to a pixel ("small" being for example 0 to 50% of $V_{off}$), the tuning of the exciton absorption causes the transmission of the MQW layer to decrease at the operating wavelength, which in turn causes $R_{on}$ to drop to $R'_{on}$ (where $R'_{on} < R_{on}$). Adjustment of the common bias $V_{on}$ so that $R'_{on} = R_{off}$ balances the device. Application of an additional bias $V'_{off} = V_{off} - V_{on}$ to selected pixels causes those pixels to switch to the 180°-reflection-phase state. The phase modulator than operates between the two bias points $V'_{on}$ and $V_{off}$ which have equal reflected intensity and 180° phase-shift between them. The common bias $V'_{on}$ can be applied to all pixels by applying the potential at the ground plane of the array.

For the case $R_1 > R_1^{\phi-opt}$, the resulting reflectivities will be unbalanced such that $R_{on} < R_{off}$. In this case the modulator can be balanced by decreasing the $V_{off}$ bias which lowers the MQW absorption in the off state, thus decreasing $R_{off}$.

For both the phase and intensity modulators, the adjustment of the bias voltages to balance the SLM makes use of the natural line width of the QW exciton absorption which causes a gradual drop in transmission through the MQW layer (at the operating wavelength) as the bias voltage is changed. If the natural line width is not sufficiently broad, or for operation at cryogenic temperature were the excitons are very narrow, the effective width of the MQW absorption can be increased by replacing the MQW layer containing QWs of equal width with a MQW layer containing a distribution of widths such that the combined absorption of all the Qws forms an advantageously broadened absorption feature.

It will be appreciated that, between the two phase states of the binary phase modulator, there is a zero-reflectivity state as in the intensity modulator described above. Thus, the binary phase modulator is a tri-state device having the states: $\Theta=0°$, R=O, and $\Theta=180°$.

The principles described above in connection with FIG. 2 can be applied to a practical device using standard semiconductor growth, such as molecular beam epitaxy, and processing technology. Realizable devices are described below in which the structures are formed from layers of AlAs, GaAs, AlGaAs, InAlGaAs, and InGaAs, although it will be appreciated that other semiconductor materials could be used.

As described above, the mirror $M_1$ is a multi-layer dielectric mirror and the mirror $M_2$ is a metallic surface mirror that also acts as one of the electrical contacts of the device and can be used to define the individual pixels during the pixel delineation etch in processing. In general, each pixel is defined by etching a trench down into the intrinsic layers, thereby yielding an electrically isolated structure. It will be appreciated that the mirror $M_2$ could also be fabricated as a multi-layer dielectric mirror, but metal currently seems more advantageous because it can easily be applied after the thickness correction of the epitaxially grown structure, and its electrical conductivity provides for electrical connection to the device. When used as an electrical contact to an indium bump, the metal forming mirror $M_2$ (typically gold) is coated with a second metal (e.g., nickel) to prevent interdiffusion of the indium with the mirror metal.

FIG. 3 is a schematic diagram representative of a multi-layer structure of an intensity modulator 110 in accordance with Applicants' invention. The intensity modulator 110 is intended for operation at a wavelength of about 940 nm where the GaAs substrate 140 is transparent. Thus, light enters through the substrate (bottom of Figure), and reflects, as previously described, from the ASFPE structure formed by the layers above. Exemplary doping levels are indicated in the Figure. It will be appreciated that the structure shown in FIG. 3 is just one example of a class of modulator structures in accordance with Applicants' invention in which layer thicknesses and compositions can be varied over a wide range of values.

The active optical layer 120 is comprised of a quantum well modulator section 122 having 80.5 periods of alternating 100-Å-wide well layers of $In_{0.08}Ga_{0.92}As$ and 50-Å-wide barrier layers of $In_{0.0746}Al_{0.3}Ga_{0.6254}As$. The active optical layer 120 also includes a strain layer superlattice section 124 having sixty-seven periods of alternating 56-Å-wide well layers of $In_{0.122}Al_{0.494}Ga_{0.384}As$ and 19-Å-wide barrier layers of $Al_{0.563}Ga_{0.437}As$. The strain layer superlattice section 124 provides an advantageous interface between the crystal lattice of the substrate and dielectric mirrors and the slightly different crystal lattice of the QW layers.

The partially reflecting mirror 130 ($M_1$) is conveniently made of 6.5 periods of alternating layers of GaAs and AlAs, each λ/4 thick, and is disposed on a convenient buffer layer of GaAs having a thickness of 5000 Å. The substrate is also GaAs, and it will be appreciated that, at shorter operating wavelengths where GaAs is not transparent, the substrate and the buffer layer may be removed, by mechanical polishing and/or chemical etching for example. In this way, the modulator can operate in a wider range of wavelengths and be fabricated from a wider range of materials and material structures. A suitable epoxy is preferably wicked-in around the indium bump bonds to provide additional strength to the epitaxial structure, thereby avoiding shattering during removal.

The mirror 135 ($M_2$) is a layer of gold or gold alloy applied to the surface of the structure, and separated from the active optical layer 120 by a p-doped etch tuning layer 137 comprising about eighty periods of alternating layers of $In_{0.08}Ga_{0.92}As$ and $In_{0.0746}Al_{0.3}Ga_{0.6254}As$, each 20 Å thick. The etch tuning layer can be partially removed to adjust the overall thickness of the modulator and compensate semiconductor process variations as described further below. With n-type contact layers 145, the modulator 110 has a P-I-N diode configuration, which enables a sufficiently large electric field to be applied to the active optical layer without requiring a high-voltage/high-current bias source. It will be appreciated that an n-doped etch tuning layer and p-type contact layers could be used instead. The substrate is intrinsic to reduce possible absorption due to free carriers in this thick layer.

The electric field across the modulator is produced by applying a reverse bias voltage between the top metal contact 135 and the doped, conductive substrate 140. The applied field is given by the following relation:

$$E = V_{bias}/t_{intrinsic} \qquad \text{Eqn. 4}$$

where $t_{intrinsic}$ is substantially the sum of the thicknesses of the undoped layers, e.g., the active optical layer 120 and the multi-layer dielectric mirror 130.

It is important to avoid residual material strain in the InGaAs/InAlGaAs MQW structure that can arise from the mismatch of the lattice constants of the MQW layers and the GaAs substrate. The residual strain would result in a cross-hatch topography pattern on the wafer surface that would cause light scattering and phase distortion when the device was operated, resulting in a lower than expected on:off ratio for the intensity modulator.

The strain layer superlattice 124 shown in FIG. 3 is designed to accommodate the differences between the lattice constant of the substrate and that of the quantum-well material. This is accomplished by growing a set of superlattices having a lattice constant larger than that required in the quantum-well layers. This set of superlattices relaxes during growth to an intermediate lattice constant, between its normal lattice spacing and that of the underlying GaAs substrate. The strain layer superlattice is designed so that this intermediate lattice constant is the correct lattice constant for the InGaAs/InAlGaAs material.

FIG. 4 shows experimentally determined values of reflectivity for wavelengths between about 850 nm and 1050 nm for a zero-biased modulator as in FIG. 3. The measurements were taken on the substrate side of the modulator. In FIG. 4, the solid line is the spectrum measured after the metal mirror 135 was deposited and the dotted line is the spectrum before the mirror 135 was deposited. Two features of the spectra that are important to note are the quantum-well exciton absorption peaks and the ASFPE resonances that are indicated by the respective arrows. Since the modulator must operate at the fixed wavelength of the ASFPE resonance and significant modulation by the quantum wells is obtained only for wavelengths approximately 10 nm longer than the exciton absorption peak, the relative placement of these two features is critical.

FIG. 5 shows the calculated shifts in the quantum well exciton wavelength ($\lambda_{ex}$) and the optical resonance wavelength ($\lambda_{resonance}$) due to errors in the layer thickness. Since the quantum-well exciton absorption peak shifts slowly with layer thickness, an accuracy of a few percent in layer thickness is sufficient to place this feature at a predetermined wavelength. In contrast, both the wavelength of the mirror ($M_1$) reflection peak and the FPE resonance are proportional to the layer thickness and shift more rapidly than the exciton wavelength. Because the FPE resonance has a more narrow bandwidth than that of the $M_1$ mirror resonance, it is the most critical of the three thickness-dependent features. An accuracy of 0.1% is required to position this feature at a predetermined wavelength. Such accuracy is not available with present semiconductor growth technology. To position FPE resonance wavelength with the required accuracy, the cap layer 137 includes an expendable etch tuning layer such that the total thickness of the device is greater than required, and the ideal position of the second mirror lies within the cap layer 137.

Figure 6:
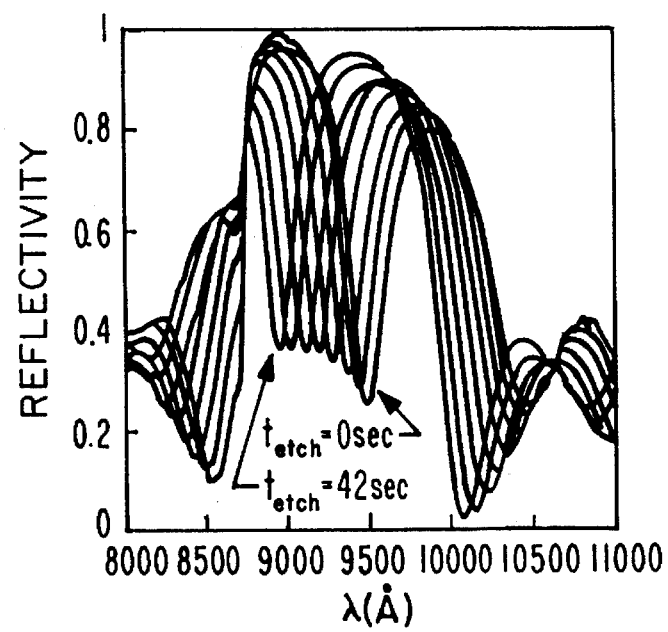
FIG. 6 shows reflection spectra of an ASFPE-SLM having various thicknesses, demonstrating the resonance wavelength shift caused by etching.

After growth of a modulator structure, the reflectivity spectrum can be measured (from either side of the wafer) and the excess spacer layers etched away until the ideal FPE resonance wavelength is achieved. FIG. 6 shows eight reflectivity spectra obtained from the top side of a structure similar to that illustrated in FIG. 3 (but having no quantum wells) after repeated weak chemical etches for periods of six seconds each. Before any etching, the FPE resonance wavelength was about 990 nm, and after seven 6-sec etches, the FPE resonance wavelength was at the desired 940 nm.

Figure 7:
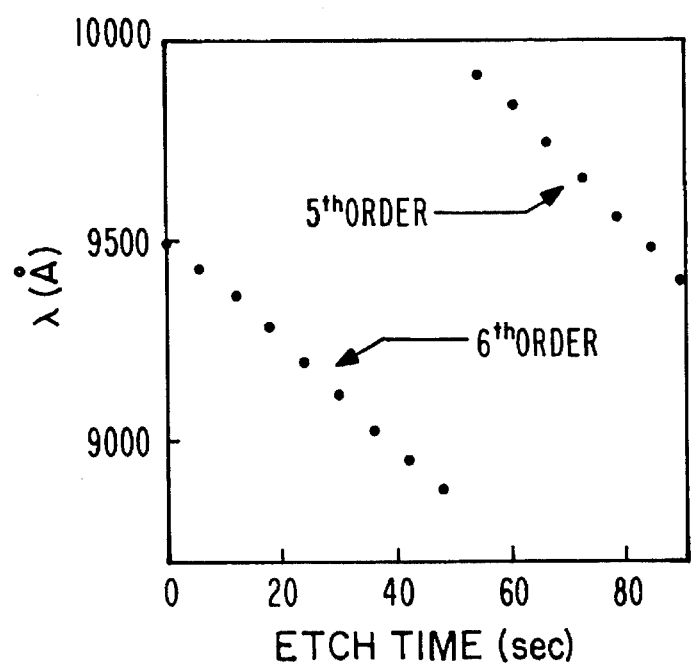
FIG. 7 illustrates the change in resonance wavelength of an ASFPE-SLM as a function of etching time.

FIG. 7 shows the changes in the resonance wavelengths for two orders of the FPE as a function of etch time. The smoothness of the curves demonstrates that the etch is a well controlled process that can be used to position the FPE resonance with the necessary accuracy. It will be appreciated that, for an actual modulator, the FPE resonance would not be positioned at the final predetermined wavelength since the metal mirror produces a phase shift (e.g., 130° for gold) that shifts the optical resonance peak as seen in FIG. 4.

Since the etch tuning process is done before the metal is applied to $M_2$, the change in $\phi_2$ (see Eqn. 1a) caused by the metal (as demonstrated by the shift shown in FIG. 4) must be taken into account during the tuning process. The phase shift can be calculated using Eqn. 5 below.

$$\Delta\phi = \arctan\left[\frac{2 \cdot n_1 \cdot k_2}{n_1^2 - n_2^2 + k_2^2}\right] - 180° \qquad \text{Eqn. 5}$$

where:

$n_1$ = refractive index of GaAs ($n_1$=3.4);

$n_2$=real part of the refractive index of the metal; and $k_2$=imaginary part of the refractive index of the metal.

For gold at a wavelength of $\lambda$=940 nm, $n_2$=0.174 and $k_2$=5.69, which results in a phase shift of $\Delta\phi_2$=−139°.

The corresponding shift in the resonance is given by:

$$\Delta\lambda_{metal} = \lambda^2 \cdot \frac{\Delta\phi}{4\cdot\pi\cdot\sum_k t_k \cdot n_k} \quad \text{Eqn. 6a}$$

which for the structure in FIG. 3 at $\lambda$=940 nm would produce a wavelength shift of about −25 nm for the phase shift calculated above. In practice, the correction is usually calculated by measuring the spacing between two of the cavity modes ($\lambda_1$, $\lambda_2$); the shift is then given by:

$$\Delta\lambda_{metal} = \frac{\Delta\phi}{2\pi} \cdot |\lambda_1 - \lambda_2| \quad \text{Eqn. 6b}$$

Since the operating wavelength should be about 10 nm longer than the position of the quantum well exciton, the position of the exciton ($\lambda_{ex}$) is measured along with the two resonance lines, and the structure is then etched until a cavity mode is placed at the target wavelength ($\lambda_{target}$) given by:

$$\lambda_{target} = \lambda_{ex} + 10 \text{ nm} - 42\, \lambda_{metal} \quad \text{Eqn. 7}$$

Figure 8:
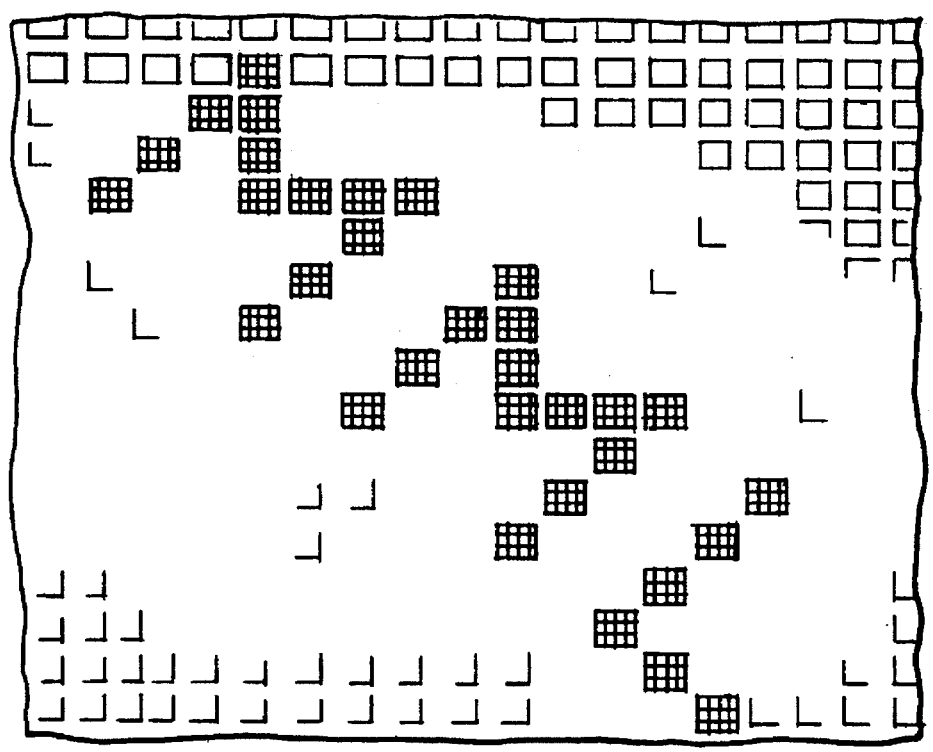
FIG. 8 shows an image of one embodiment of Applicants' invention operating at a wavelength of 940 nm.

FIG. 8 shows an image of the described SLM device operating at a wavelength of 940 nm. The device consists of a 16×16 array of pixels on 50-μm centers on a GaAs substrate with the epitaxial structure shown in FIG. 3. The optical array is bonded to a silicon drive circuit via an array of indium bumps with one indium bump on each pixel that is mated via cold soldering to a corresponding indium bump on the output pads of the silicon drive circuit. A 16×1 row of bumps on both the optical array and the driver provide the common n-contact connection. Input to the driver is provided by sixteen digital data lines in conjunction with voltage supply, control and clock inputs. The 16×16 pattern on the SLM can be changed at more than 100,000 frames per second.

Another embodiment of Applicants' invention does not use the strain layer superlattice 124 needed in the ASFPE-MQW modulator shown in FIG. 3. This currently preferred embodiment, illustrated in FIGS. 9A–9C, operates at a shorter wavelength that does not require indium in the MQW structure. This design is completely lattice-matched to the GaAs substrate material, so it does not have any residual strain to degrade the device performance and does not require the strain layer superlattice. To eliminate the absorption in the GaAs substrate at short wavelengths, the GaAs substrate is removed and replaced with a transparent material as described below.

Figure 9A:
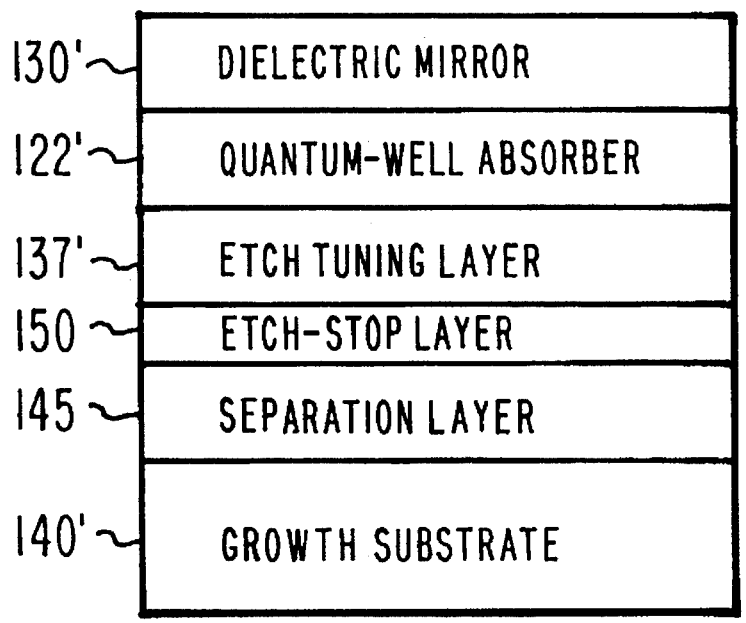

It will be appreciated that the structure shown in FIG. 9C is just one example of a class of modulator structures in accordance with Applicants' invention in which layer thicknesses and compositions can be varied over a wide range of values. Sections of the modulator in FIGS. 9A–9C that correspond to sections in FIG. 3 are identified by primed reference numerals. Exemplary doping levels are indicated in FIG. 9C.

Figure 9B:
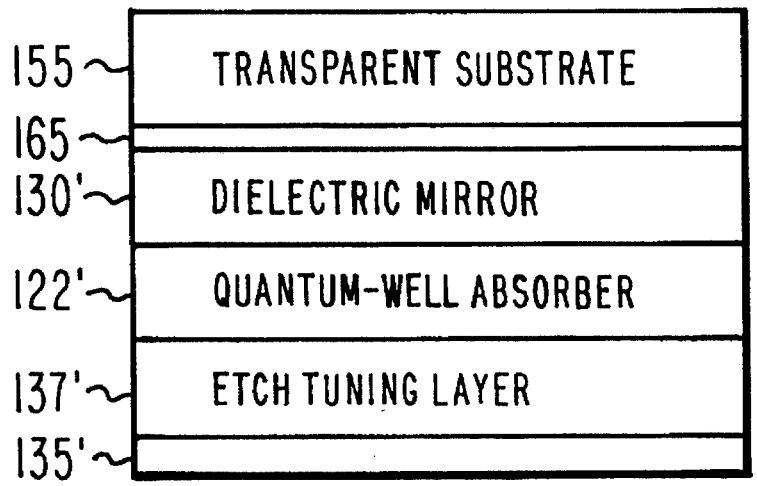

The modulator shown in FIG. 9B has the GaAs growth substrate 140' completely removed during device processing and the remaining epitaxial layers bonded by an epoxy layer 165 to a transparent substrate 155. To accomplish substrate removal and replacement, the structure is grown as shown in FIG. 9A with the layers in reverse order, with two additional layers (a separation layer 145 and an etch-stop layer 150) added. As seen in FIG. 9C, the separation layer comprises, for example, a 5000-Å thickness of AlAs and the etch-stop layer comprises, for example, a 500-Å thickness of GaAs. Also, an n-type contact layer 180 and a buffer layer 182 are disposed between the mirror layer 130' and the MQW structure 122'. The buffer layer 182 comprises a 200-Å thickness of AlGaAs and provides a controlled interface for the MQW layers 122'; the contact layer 180 comprises 125 periods of alternating 20-Å-thick GaAs and 20-Å-thick AlGaAs and is described further below. A 100-Å-thick GaAs growth cap may also be provided atop the multilayer mirror 130'. The growth cap plus the adjacent mirror layer sum to a total optical thickness of $\lambda/4$.

Figure 10:
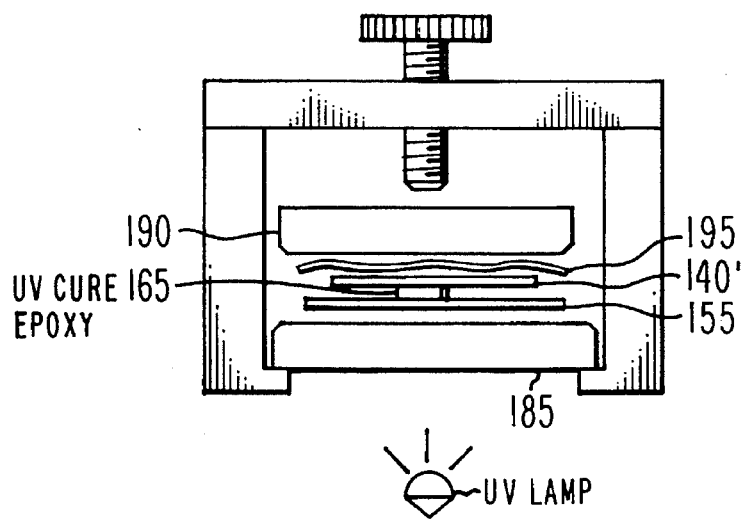
FIG. 10 illustrates an apparatus and arrangement for forming the modulator shown in FIGS. 9A–9C.

The wafer is then epoxied to the transparent substrate material 155 as shown in FIG. 10. The new transparent substrate 155 is placed on an optical flat 185 with ultraviolet-light-curable epoxy 165 on the top surface. The GaAs wafer 140' is placed growth side down onto the transparent substrate 155 and pressed against it and the optical flat 185 using a plate 190 and resilient pad 195. This maintains the optical flatness of the new transparent substrate 155 and forces the GaAs surface to conform to the new optically flat substrate surface.

Figure 11A:
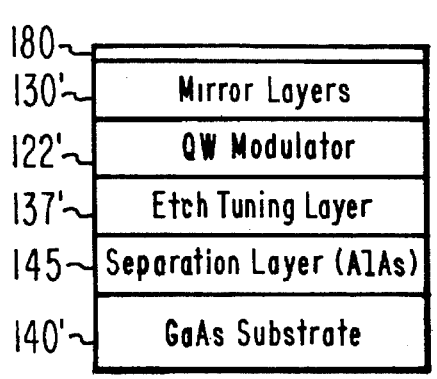
FIGS. 11A–11D illustrate processing stages in forming the modulator shown in FIGS. 9A–9C.
Figure 11B:
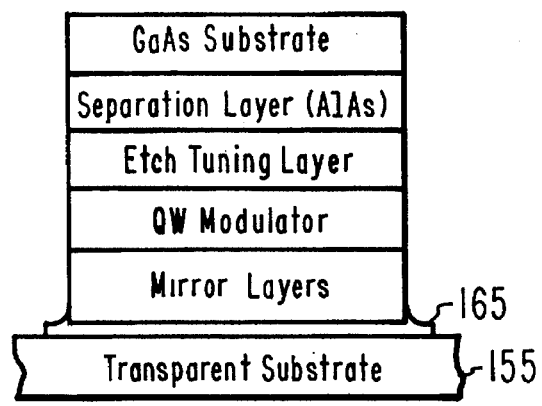
Figure 11C:
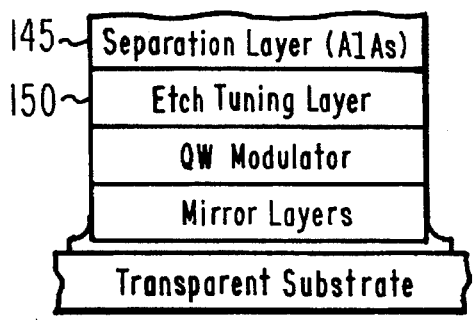
Figure 11D:
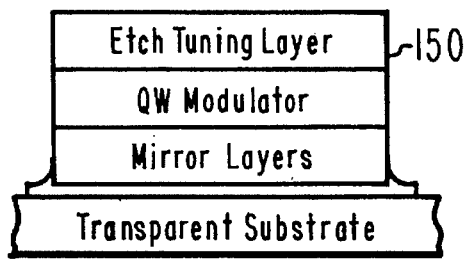

Following bonding to the new substrate 155, the growth substrate 140' is etched away. This process is summarized in FIGS. 11A–11D which show the as-grown wafer with a metallic contact pattern 180 (FIG. 11A) and the wafer bonded to the transparent substrate 155 by the epoxy layer 165 (FIG. 11B). Removal is begun by rough mechanical polishing of the substrate until only about 50 μm to 75 μm of the GaAs growth substrate remains. Further chemical/mechanical polishing using for example, chlorine bleach and a felt polishing pad, is used until the AlAs separation layer 145 is reached (FIG. 11C). Any remaining separation layer material is then chemically etched away using for example, a solution of HCl, leaving the epitaxial MQW structure on the new transparent substrate 155 with the etch stop layer 150 at the surface of the new structure (FIG. 11D). Because the final chemical etch stops at the etch-stop layer this process yields a device that is nearly atomically flat, as grown in an MBE system. This flatness eliminates any phase distortion that could be caused by layer thickness variations. This process produces a thin (e.g., 2.5 μm) film of the epitaxially grown SLM structure bonded to a transparent substrate. This bonded structure can then be tuned to correct for errors in layer thicknesses and processed into an SLM device as previously described.

This process also enables processing both sides of the epitaxial structure. As indicated in FIG. 11A, the metal contact layer 180 can be patterned on the as-grown wafer before it is bonded to the new substrate 155. Applicants have used this ability to apply n-contacts to a device since such contacts must be thermally annealed at a temperature too high for the epoxy to withstand. The n-contacts 180 are applied and annealed to the as-grown wafer before bonding, then holes are etched from the new surface (the etch tuning layer 137' shown in FIG. 11B) down to the annealed n-contact during later processing to provide electrical contacts to the n-contact layers.

This process of removing the growth substrate 140' and replacing it with a transparent substrate 155 has several advantages. The device can operate at shorter wavelengths where silicon detectors are more efficient and diode lasers are more readily available. Since no indium is required in the epitaxial layers, there are no strain problems which can degrade the SLM's on:off ratio. An optically flat transparent substrate can be used (GaAs substrates generally have several micrometers of surface ripples). Since the wafer is pressed tightly against the transparent substrate 155 during bonding, the glue line 165 is very thin (0.1 to 0.2 μm) and the epitaxial material takes on the surface profile of the new substrate. For cryogenic applications, the transparent substrate 155 can be chosen to match the thermal expansion coefficient of the electronic drive circuits, which are typically fabricated on silicon. This enables fabrication of large arrays that avoid failure due to thermal cycling. For high power applications, a substrate 155 can be chosen that has high thermal conductivity so that it can be used as a heat sink. Both diamond and sapphire have high thermal conductivities at cryogenic temperatures.

Figure 12:
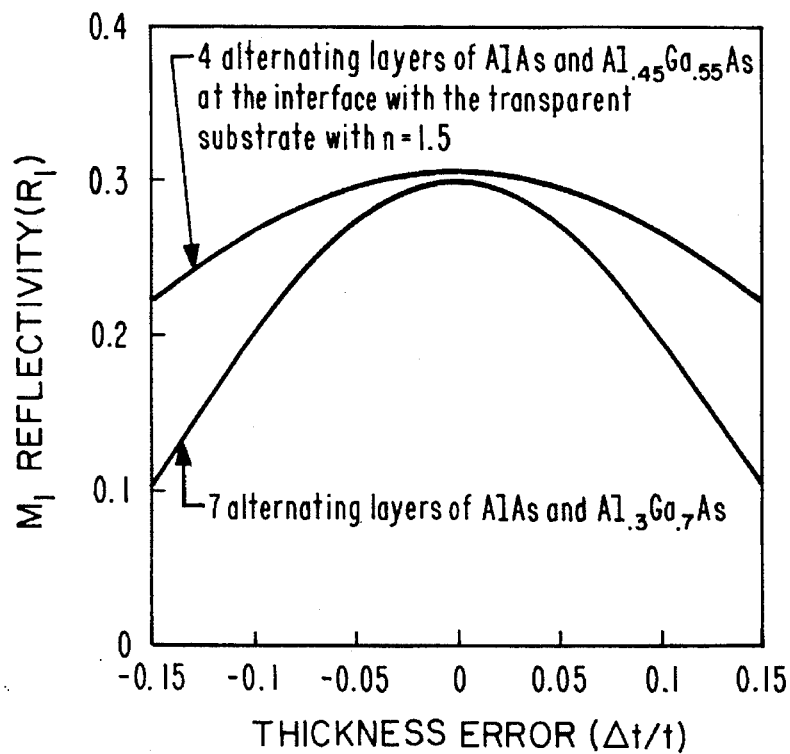
FIG. 12 shows a comparison of the reflectivity spectra of two types of multi-layer mirrors ($M_1$) used in two embodiments of Applicants' invention.

An additional advantage to the substrate replacement process is that it provides a broadband $M_1$ mirror. Since the refractive index of GaAs is approximately 3.4, and that of the replaced substrate is approximately 1.5, the interface between the two provides a natural reflectivity of 35%. This reflectivity is substantially wavelength independent. To provide higher reflectivity for $M_1$, quarter-wavelength mirror layers can be added (130' in FIG. 9C) at this interface if necessary. The interface reflection decreases the number of layers needed to achieve a given reflectivity. This is demonstrated in FIG. 12 which shows the calculated reflectivities of a multilayer mirror with a total of seven layers, and a mirror with four layers in addition to the GaAs-to-transparent-substrate interface. Both mirrors have substantially the same peak reflection. Because the mirror reflection bandwidth decreases with the number of layers, the second structure produces a broader band mirror. This broader bandwidth allows greater variation in the layer thicknesses before the reflectivity of $M_1$ drops at the operating wavelength. As already discussed, the narrow cavity resonance is the most critical feature relative to the layer thickness variation, but this feature can be tuned. Mirror $M_1$ is fixed during the growth, so it is important for it to be as broadband as possible to allow for the initial growth errors.

Figure 13:
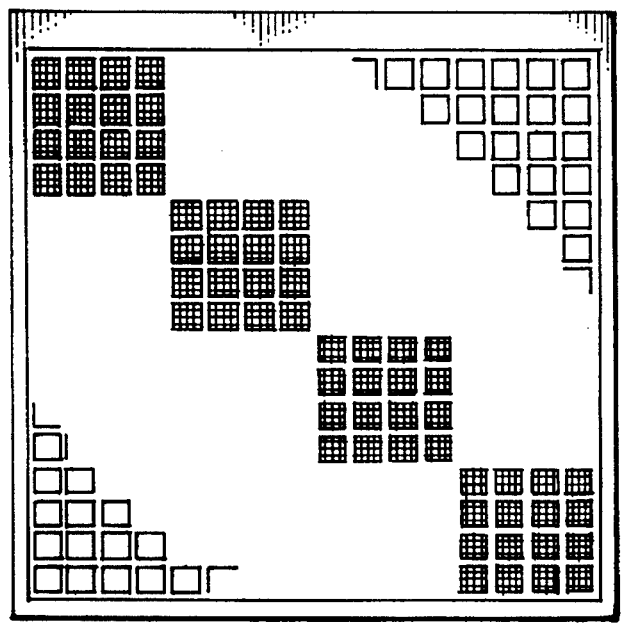
FIG. 13 shows an image of an embodiment of Applicants' invention operating at a wavelength of 860 nm.

FIG. 13 shows an image of the described device operating at a wavelength of 860 nm. The transparent substrate incorporated in this device is fused quartz. The optical array is bonded to a silicon drive circuit and operated as described for the previous device.

Applicants' process for substrate removal has advantages over existing techniques, such as those described in E. Yablonovitch et al , "Extreme Selectivity in the Lift-Off of Epitaxial GaAs Films," *Applied Physics Letters* vol. 51, pp. 2222–2224 (Dec. 28, 1987); M. Konagai et al., "High Efficiency GaAs Thin Film Solar Cells by Peeled Film Technology," *J. Crystal Growth* vol. 45, pp. 277–280 (1978); and F. Stern et al., "Photon Recycling in Semiconductor Lasers," *J. Applied Physics* vol. 45, pp. 3904–3906 (Sep. 1974). The final chemical etch removes only the exposed AlAs separation layer 145. In the existing techniques, a long soak in acid is used to etch in from the sides of the wafer. This would etch any layer in the device containing a high concentration of aluminum, making these techniques inappropriate for vertical-cavity devices that use AlAs layers in the multi-layer dielectric mirrors 130'. Applicants' method has been used on SLM structures with no damage to the AlAs layers in their reflectors. Also in Applicants' technique, the epitaxial layers are never self-supporting, so there is less chance of crystal damage.

The hybrid design of Applicants' modulator, integrating electronic and optical structures on a pixel-by-pixel basis, permits very high frame rates with very large fill factors for large spatial light modulators. Moreover, use of a transparent substrate enables the use of bump-bonding techniques to produce the device in a simple, reliable, inexpensive manner.

It is currently believed that the Applicants' invention is particularly useful in optical processing systems for such uses as optical correlation, Fourier analysis of data, matrix manipulation, and other optical computing uses, each with many applications. The size and speed of Applicants' SLM should enable these systems to operate at useful speeds. For example, an optical correlator is a system for comparing images that may search through a library of images for a match to an input image, such as a file of fingerprints to match a fingerprint found at a crime scene. With Applicants' invention, tens of thousands of image comparisons can be made per second.

Another application of Applicants' invention is expected to be in the area of optical data storage. This device can be the input for encoding optical patterns onto or into an optically sensitive material (such as an optical disk) for storing information. A large, high-speed spatial light modulator should allow parallel input of large amounts of data, as compared to the serial data input that is now used in optical storage systems.

Applicants' invention has been described above in terms of specific embodiments. It will be readily appreciated by one of ordinary skill in the art, however, that the invention is not limited to those embodiments, and that, in fact, the principles of the invention may be embodied and practiced in other devices and methods. Therefore, the invention should not be regarded as delimited by those specific embodiments but by the following claims.

What is claimed is:

1. A spatial light modulator including quantum wells and Fabry-Perot etalons, comprising:

(A) a transparent non-semiconductor dielectric substrate having a first composition transparent to photons within a particular energy range, and having a first index of refraction;

(B) said spatial light modulator further including a plurality of modulator pixels responsive to said photons within said particular energy range, each of said pixels comprising:

(1) a partially reflective dielectric mirror and common electrical contact layer adjacent to said transparent substrate, said dielectric mirror and common electrical contact layer comprising (a) a first layer of a first semiconductor material, having an index of refraction higher than that of said transparent substrate, said first layer of said first semiconductor material being adhesively affixed to said transparent substrate, whereby the junction between said transparent substrate and said first layer of said first semiconductor material is a relatively wavelength independent mirror, said dielectric mirror and common electrical contact layer further comprising (b) a plurality of additional layers, at least one of which is electrically conductive, said additional layers including alternating layers of a second semiconductor material and said first semiconductor material, said second semiconductor material having an index of refraction lower than that of said first semiconductor material;

(2) a quantum well layer supported by that side of said dielectric mirror and common electrical contact layer remote from said first layer of said dielectric mirror and common electrical contact layer, said quantum well layer including a plurality of alternating layers of (a) third semiconductor material having a particular ground energy state, and (b) a further semiconductor material having a ground energy state higher than said particular ground energy state, whereby said quantum well layer includes a plurality of quantum wells;

(3) an optically non-transmissive metallic mirror layer; and (4) means for mechanically and electrically coupling said metallic mirror layer to said quantum well layer; said modulator further comprising:

(C) an electronics section including drive electronics for generating a plurality of individual electrical drive signals; and (D) coupling means coupled to said drive electronics, to said electrically conductive layer of said dielectric mirror and common electrical contact layer, and to said metallic mirror layers of said pixels of said modulator, for coupling each of said individual electrical drive signals to said metallic mirror layer of a different one of said pixels.

2. A modulator according to claim 1, wherein said first semiconductor material is gallium arsenide, and said second semiconductor material is aluminum gallium arsenide.

3. A modulator according to claim 1, wherein said transparent non-semiconductor substrate material is sapphire.

4. A modulator according to claim 2, wherein said third semiconductor material is gallium arsenide, and said further semiconductor material is aluminum gallium arsenide.

5. A modulator according to claim 1, wherein said electrically conductive one of said additional layers of said dielectric mirror and electrical contact layer is doped, to provide enhanced electrical conduction.

6. A modulator according to claim 1, wherein said first semiconductor material has a transmissivity for said photons within said particular energy range which is lower than that of said transparent non-semiconductor substrate.

7. A modulator according to claim 1, further comprising a buffer layer of intrinsic semiconductor material lying between said electrical contact and quantum well layers.

8. A modulator according to claim 1, wherein said dielectric mirror and electrical contact layer is continuous across said plurality of pixels.

9. A modulator according to claim 1, wherein:

said electronics section is physically located adjacent said metallic mirrors of said pixels of said modulator, and includes a plurality of drive signal terminals in registry with a like plurality of said pixels of said modulator, and equidistant from the corresponding one of said pixels; and said coupling means comprises a plurality of electrically conductive bonds extending between corresponding ones of said drive signal terminals and said metallic mirror of said pixels of said modulator.

10. A modulator according to claim 2, further comprising an interface layer lying between said quantum well layer and said dielectric mirror and electrical contact layer, said interface layer comprising at least one layer of one of said first and second semiconductor materials.

* * * * *